United States Patent
Kennedy

(10) Patent No.: US 11,598,072 B2
(45) Date of Patent: Mar. 7, 2023

(54) WORK VEHICLE DEBRIS ACCUMULATION CONTROL SYSTEMS

(71) Applicant: Deere & Company, Moline, IL (US)

(72) Inventor: Thomas L. Kennedy, Dubuque, IA (US)

(73) Assignee: DEERE & COMPANY, Moline, IL (US)

(*) Notice: Subject to any disclaimer, the term of this patent is extended or adjusted under 35 U.S.C. 154(b) by 361 days.

(21) Appl. No.: 16/902,551

(22) Filed: Jun. 16, 2020

(65) Prior Publication Data

US 2021/0388579 A1    Dec. 16, 2021

(51) Int. Cl.
*E02F 9/26* (2006.01)
*B60Q 9/00* (2006.01)
(Continued)

(52) U.S. Cl.
CPC ............... *E02F 9/26* (2013.01); *B60Q 9/00* (2013.01); *B60R 1/00* (2013.01); *E02F 9/0866* (2013.01);
(Continued)

(58) Field of Classification Search
CPC ........ A01B 69/001; A01B 76/00; B60Q 9/00; B60R 1/00; B60R 2300/10; B60R 2300/107; B60R 2300/108; B60R 2300/8006; E02F 9/0866; E02F 9/2033; E02F 9/2062; E02F 9/2095; E02F 9/24;
(Continued)

(56) References Cited

U.S. PATENT DOCUMENTS

| 6,029,430 A | 2/2000 | Isfort et al. |
| 2015/0296701 A1 | 10/2015 | Anderson |

(Continued)

FOREIGN PATENT DOCUMENTS

| CN | 106985940 A | 7/2017 |
| EP | 0443210 A1 | 8/1991 |

(Continued)

OTHER PUBLICATIONS

Deere & Company, pending Utility U.S. Appl. No. 16/841,191, filed Apr. 6, 2020.

(Continued)

*Primary Examiner* — Tyler J Lee
(74) *Attorney, Agent, or Firm* — Klintworth & Rozenblat IP LLP

(57) ABSTRACT

A debris accumulation control system is provided for usage within a work vehicle including an operator station and a work vehicle compartment. In embodiments, the work vehicle debris accumulation control system includes a display device located in the operator station of the work vehicle, a three dimensional (3D) imaging device having a field of view (FOV) encompassing a debris-gathering region of the work vehicle compartment, and a controller operably coupled to the display device and to the 3D imaging device. The controller is configured to: (i) utilize 3D imaging data provided by the 3D imaging device to estimate a debris accumulation risk level within the work vehicle compartment; and (ii) generate a first visual alert on the display device when the debris accumulation risk level surpasses a first predetermined threshold.

20 Claims, 7 Drawing Sheets

(51) Int. Cl.
  *B60R 1/00* (2022.01)
  *E02F 9/20* (2006.01)
  *E02F 9/24* (2006.01)
  *G06T 7/00* (2017.01)
  *E02F 9/08* (2006.01)
  *F01N 9/00* (2006.01)

(52) U.S. Cl.
  CPC .......... *E02F 9/2033* (2013.01); *E02F 9/2062* (2013.01); *E02F 9/2095* (2013.01); *E02F 9/24* (2013.01); *F01N 9/00* (2013.01); *G06T 7/0004* (2013.01); *B60R 2300/10* (2013.01); *B60R 2300/107* (2013.01); *B60R 2300/108* (2013.01); *B60R 2300/8006* (2013.01); *G06T 2207/10021* (2013.01); *G06T 2207/30252* (2013.01)

(58) Field of Classification Search
  CPC .... E02F 9/26; F01N 9/00; G06T 2207/10021; G06T 2207/30252; G06T 7/0004
  See application file for complete search history.

(56) References Cited

U.S. PATENT DOCUMENTS

| | | | |
|---|---|---|---|
| 2017/0138017 | A1 | 5/2017 | Halepatali et al. |
| 2018/0120098 | A1* | 5/2018 | Matsuo ................... E02F 9/264 |
| 2018/0340316 | A1* | 11/2018 | Izumikawa ............... E02F 9/16 |
| 2020/0040555 | A1 | 2/2020 | Hageman et al. |

FOREIGN PATENT DOCUMENTS

| | | |
|---|---|---|
| EP | 0887524 A2 | 6/1998 |
| KR | 101513587 31 | 4/2015 |
| WO | WO2019117166 A1 | 12/2020 |

OTHER PUBLICATIONS

Deere & Company, pending Utility U.S. Appl. No. 16/430,837, filed Jun. 4, 2019.

Extended European Search Report and Written Opinion issued in European Patent Application No. 21175882.6, dated Dec. 6, 2021, in 08 pages.

* cited by examiner

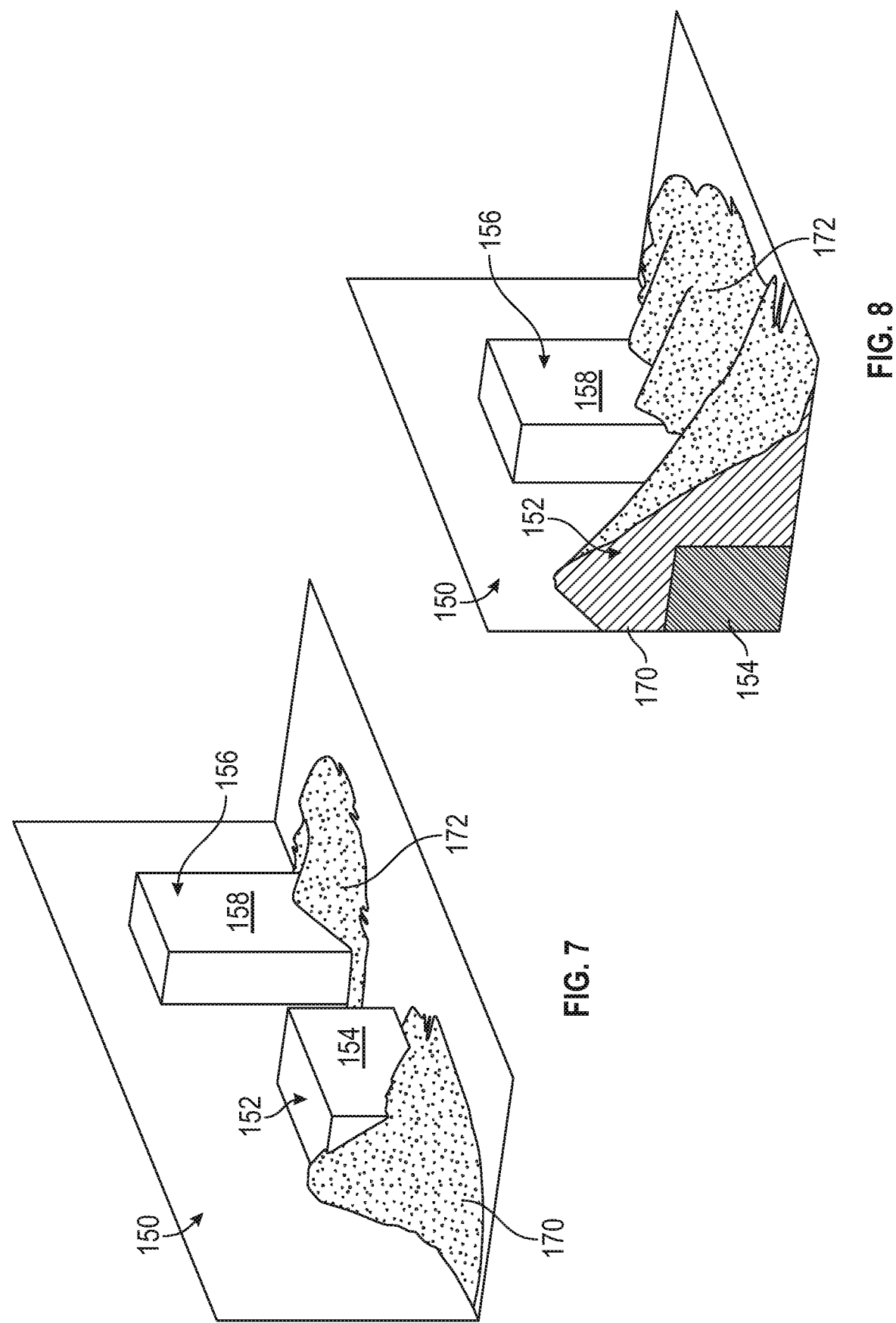

WORK VEHICLE DEBRIS ACCUMULATION CONTROL SYSTEMS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to debris accumulation control systems for usage within work vehicles, such as work vehicles operated in debris-laden environments.

BACKGROUND OF THE DISCLOSURE

Work vehicles commonly operate in environments containing relatively large quantities of debris. Such debris (referred to herein as "Foreign Object Debris" or "FOD") may become airborne and, ultimately, may be ingested into the engine compartment and other open air compartments of the work vehicle. FOD may accumulate in different regions of the work vehicle compartments and may pose a fire risk, the severity of which depends upon several factors including the combustibility of the FOD, the quantity of the FOD accumulation, and the likelihood of FOD exposure to a source of ignition. Certain systems have been proposed for reducing the likelihood of fires resulting from FOD accumulation (herein, "FOD-induced fires") by impinging airstreams against external regions of work vehicle components to minimize FOD build-up, while reducing peak skin temperatures of heated work vehicle (e.g., engine) components to decrease the likelihood of FOD ignition. Other proposed systems rely on the active circulation of Freon or another liquid coolant through engine components to reduce peak skin temperatures, again decreasing the likelihood of FOD ignition. Such existing FOD-mitigation systems, however, can be undesirably complex and costly. In many instances, such systems may be less effective at reducing the likelihood of FOD-induced fires than frequent operator cleaning of work vehicle compartments susceptible to FOD build-up. Additionally, existing FOD-mitigation systems focusing on reducing peak skin temperatures within work vehicle engine compartments do little to reduce the risk of FOD-induced fires in other work vehicle compartments, which may also be prone to FOD accumulation and potential fire risk in certain instances.

SUMMARY OF THE DISCLOSURE

A debris accumulation control system is provided for usage within a work vehicle including an operator station and a work vehicle compartment. In embodiments, the work vehicle debris accumulation control system includes a display device located in the operator station of the work vehicle, a three dimensional (3D) imaging device having a field of view (FOV) encompassing a debris-gathering region of the work vehicle compartment, and a controller operably coupled to the display device and to the 3D imaging device. The controller is configured to: (i) utilize 3D imaging data provided by the 3D imaging device to estimate a debris accumulation risk level within the work vehicle compartment; and (ii) generate a first visual alert on the display device when the debris accumulation risk level surpasses a first predetermined threshold.

In further embodiments, a work vehicle debris accumulation control system includes a 3D imaging device having an FOV encompassing a debris-gathering region within a work vehicle compartment. A memory stores baseline map data, which includes or consists of 3D imaging data captured by the 3D imaging device of the debris-gathering region in a clean or essentially debris-free state. A controller is operably coupled to the 3D imaging device and to the memory. The controller is configured to: (i) utilize 3D imaging data provided by the 3D imaging device, as compared to the baseline map data stored in the memory, to monitor a volume of debris accumulation within the debris-gathering region, and (ii) selectively generate debris accumulation alerts on the display device based, at least in part, on the monitored volume of debris accumulation within the debris-gathering region.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures:

FIGS. 6-8 are simplified isometric views of a generalized work vehicle compartment including two debris-gathering regions and illustrating different scenarios under which the debris accumulation control system may assign varying debris accumulation risk levels to the work vehicle compartment based, at least in part, on the characteristics (e.g., volume and distribution) of debris accumulation within the compartment.

Figure 1:
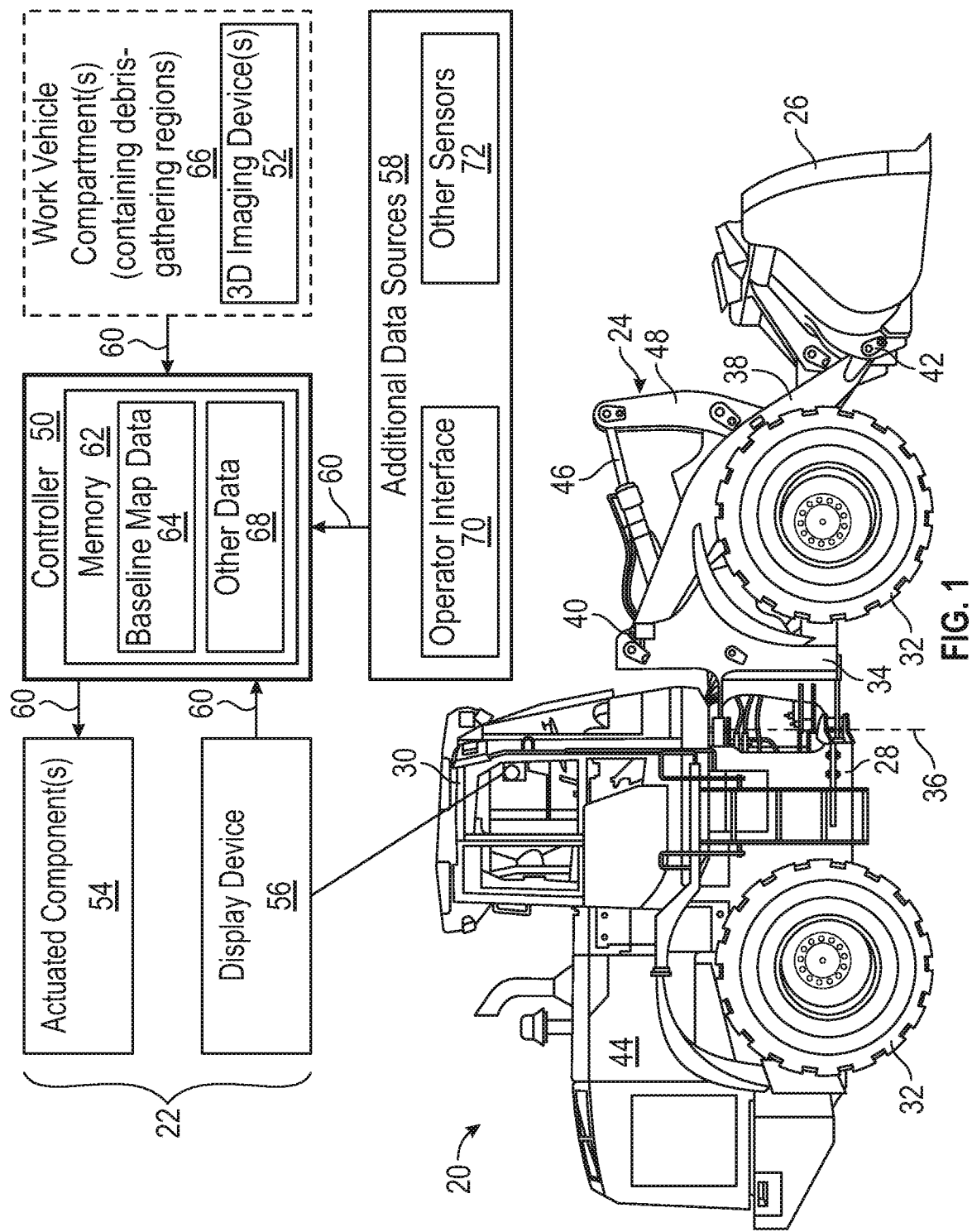
FIG. 1 is a side schematic of a work vehicle (here, a wheel loader) equipped with a debris accumulation control system, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments

Overview

The following describes debris accumulation control systems for usage onboard work vehicles, such as work vehicles operated in debris-laden environments and having compartments susceptible to the accumulation of foreign object debris (FOD). While certain work vehicle FOD mitigation systems exist, such systems traditionally attempt to prevent debris accumulation or reduce peak temperatures adjacent regions of FOD build-up through various combinations of debris clearance measures (e.g., forced airflow impinged against targeted regions of a work vehicle engine) and active liquid cooling of high temperature components, particularly high temperature engine components. Few, if any existing FOD mitigation systems actively monitor FOD accumulation within a work vehicle, assess the risk posed by such FOD accumulation levels, and then implement strategic actions or countermeasures based on such FOD risk assessments. In contrast, the below-described debris accumulation control system monitors FOD accumulation within one or more compartments of a work vehicle and selectively implement countermeasures based on the monitored FOD accumulation levels. In so doing, embodiments of the debris accumulation control system reduce the likelihood of FOD-induced fires and other issues arising from FOD accumulation within work vehicle compartments, whether by bringing excessive FOD accumulation to the attention of a work vehicle operator (e.g., to encourage cleaning of the work vehicle compartment), by implementing countermeasures to dislodge or disperse problematic FOD accumulations, by performing countermeasures to reduce the likelihood of FOD-induced fires in the presence of such excessive FOD accumulations, or any combination thereof. Embodiments of the debris accumulation control system may thus be regarded as introducing intelligence into work vehicle systems to better address FOD accumulations on a strategic basis, with the debris accumulation control system potentially utilized to complement or enhance (rather than replace) other FOD mitigation approaches.

Embodiments of the debris accumulation control system include a processing subsystem or "controller," which receives three dimensional (3D) imaging data provided by at least one three dimensional (3D) imaging device having a field of view (FOV) encompassing one or more debris-gathering regions within a work vehicle compartment. As appearing herein, the term "3D imaging device" refers to any device containing a sensor or sensor arraying capable of gathering depth data for various spatial points within the FOV of the imaging device. The term "depth data," in turn, encompasses data in the form of direct depth measurements (e.g., as captured by an acoustic sensors, radar-based sensors, or similar sensors detecting reflected energy or sonar pulses), as well as other image data from which such depths may be estimated (e.g., as captured by a stereoscopic camera assembly). In certain embodiments, a given 3D imaging device may include at least one camera, which captures imagery in the visible or infrared portions of the electromagnetic (EM) spectrum. For example, in at least some instances, a given 3D imaging device may assume the form of a stereoscopic camera assembly; that is, any assembly of two or more cameras positioned to have overlapping FOVs, which allow the estimation of the depth of physical features within the FOV of the camera assembly through established image analysis techniques of the video feeds or imagery provided by the spaced cameras. In other instances, a given 3D imaging device may emit acoustic waves or EM (e.g., short range radar) waves and then measure the returning energy utilizing a transducer array to construct a depth map of regions within the imaging device FOV. Such 3D imaging data thus enables the controller to construct a 3D map or topology of one or more monitored regions, which are located within a work vehicle compartment and susceptible to FOD accumulation.

As indicated above, the 3D imaging device (or devices) of the debris accumulation control system are strategically mounted within or adjacent at least one work vehicle compartment such that the FOV of the 3D imaging device encompasses one or more debris-gathering regions within the work vehicle compartment or cavity. As appearing herein, the term "debris-gathering region" refers to a region or spatial area within a work vehicle compartment in which FOD can accumulate to undesirably high levels. The work vehicle compartment itself may be fully enclosed but exposed to ambient airflow as in the case of, for example, an engine compartment. In other instances, the work vehicle compartment may be only partially enclosed, while possessing ledges, frame surfaces, or other such infrastructure surfaces on which undesirably large volumes of FOD can aggregate over time. Such debris-gathering regions may contain or may be located adjacent high temperature work vehicle components; that is, components having exterior surfaces consistently or periodically heated to relatively high peak temperatures during work vehicle operation. Accumulations of combustible FOD contacting such highly heated surfaces can potentially ignite and, if a given FOD accumulation possesses sufficient volume to support combustion, may result in a FOD-induced fire within the work vehicle compartment. In embodiments, such debris-gathering regions may be located adjacent to or may encompass portions of a work vehicle engine assembly, as discussed below in connection with FIGS. 1 and 2. So too may debris-gathering regions border or encompass the exterior surfaces of other work vehicle components heated to thermal extremes during work vehicle operation, such as an exhaust manifold or other exhaust-conducting components of the work vehicle.

As just described, embodiments of the work vehicle debris accumulation control system may include one or more 3D imaging devices, which monitor 3D debris accumulation adjacent internal surfaces of the work vehicle heated to highly elevated temperatures during work vehicle operation. Conventional FOD mitigation systems have traditionally attempted to actively cool such high temperature work vehicle components or to reduce FOD accumulation adjacent such components. The present disclosure further recognizes, however, that FOD accumulations within other work vehicle regions containing components remaining at lower temperatures during work vehicle operation can likewise pose the risk of fires (or other contamination issues) arising from excessive FOD build-up. In particular, even in the case of work vehicle compartments containing low temperature components, excessive levels of FOD accumulation may pose a fire risk should a randomly-generated or sporadic ignition source come into contact with a larger accumulated body of combustible FOD. Such sporadic ignition sources may be generated by action of the work vehicle itself as in the case of, for example, a spark or ember produced by friction between a moving component (e.g., a rotating drive shaft) and the surrounding static infrastructure, which rubs or intermittently contacts the moving component. In other instances, such an ignition source may originate external to the work vehicle as in the case of, for example, a spark or ember that is generated in the ambient environment; e.g., due to activity in a work area or a nearby controlled burn. In rare instances, such an externally-generated spark or ember may be ingested into a work vehicle compartment, come to rest on a combustible body of FOD, and potentially initiate a FOD-induced fire within the work vehicle compartment.

To address such issues, embodiments of the work vehicle debris accumulation control system can further monitor FOD build-up within any number of low temperature compartments of a work vehicle; the term "low temperature compartment," as appearing herein, utilized in a relative sense and referring the compartment or cavity of a work vehicle in which peak external component temperatures remain well-below the peak temperatures occurring within the work vehicle's engine compartment. Depending upon the work vehicle into which the debris accumulation control system is integrated, such low temperature compartments may include sections of a work vehicle having a lower floor or frame prone to the collection of FOD. Often, such a low temperature compartment may be partially open to the ambient environment and support an implement or tool attached to the work vehicle, perhaps by a Front End Load (FEL) assembly (e.g., in the case of loader or a tractor) or a hinged boom assembly (e.g., in the case of an excavator or a feller-buncher). Generally, then, embodiments of the debris accumulation control system can include 3D imaging devices positioned to monitor FOD accumulation in low temperature work vehicle compartments, in high temperature (e.g., engine) work vehicle compartments, or any combination thereof.

During operation of the debris accumulation control systems, the controller utilizes 3D imaging data provided by the 3D imaging device(s) to estimate a volume of debris accumulation within the monitored debris-gathering regions of one or more work vehicle compartments. In one approach, the controller renders such estimates utilizing the above-described 3D imaging data as contrasted against baseline data, which maps the depth or topology of the debris-gathering regions in a clean or substantially debris-free state. Such baseline map data may be constructed by the controller during original manufacture of the work vehicle or during any subsequently-performed calibration step, stored in local memory, and then recalled from memory by the controller when needed. In certain cases, the controller may further assign the debris accumulation risk level based, at least in part, on the estimated debris accumulation volume at a given moment in time. The controller may then perform certain prescribed actions or countermeasures should the current debris accumulation risk level (or levels should the controller concurrently FOD accumulation in multiple regions or compartments) surpass one or more predetermined thresholds. In less complex embodiments, the controller may determine the debris accumulation risk level exclusively as a function of the estimated debris accumulation volume in the monitored debris-gathering region(s). In other more complex embodiments, the controller may further consider any number of additional or secondary factors in calculating at the debris accumulation risk level. For example, in at least some implementations, the controller may consider one or more of the following parameters in assigning a debris accumulation risk level to a particular debris-gathering region or compartment of the work vehicle: the distribution of the debris accumulation within a given work vehicle compartment, the combustibility of the FOD at issue (if the type or composition of the FOD is known), the rate of FOD accumulation, current ambient weather conditions, operator input data, and any pertinent input data provided by sensors onboard the work vehicle.

As indicated above, the controller of the debris accumulation control system may perform certain precautionary actions or countermeasures when determining that an estimated debris accumulation volume or a debris accumulation risk level is undesirably high. Such countermeasures will vary between embodiments; and, in certain instances, the work vehicle debris accumulation control system may provide a range or continuum of countermeasure responses, with such responses increasing in urgency as the estimated debris accumulation risk level becomes increasingly problematic. For example, in certain embodiments, the controller may perform certain low level countermeasures when a current debris accumulation risk level surpasses a first (e.g., cautionary) threshold value and high level countermeasures when the debris accumulation risk level surpasses a second (e.g., warning) threshold value. The countermeasures taken may be tailored to the type of work vehicle under consideration, to the compartment or region of the work vehicle containing the excessive FOD build-up, to operator customization settings, and to other factors. Examples of low level countermeasure include the generation or presentation of a low level (informational or cautionary) visual alert on a display device located in an operator station of the work vehicle. Such a low level alert may advise the operator of the elevated debris accumulation risk level and the general location of the excessive FOD accumulation, while encouraging the operator to remove the FOD accumulation in a near term timeframe. Comparatively, should the debris accumulation risk level exceed a second (critical) threshold value, a high level visual alert may be generated on the display device. Such a high level visual alert conveys a greater urgency, may advise the operator to remove the detected FOD accumulation immediately, and may be accompanied by haptic or audible alerts. Further, concurrent with the generation of such high level visual alert, the controller may automatically implement any number of additional high level countermeasures affecting work vehicle operation, as further discussed below.

In embodiments in which the 3D imaging device includes a camera, such as when the 3D imaging device is realized as a stereoscopic camera assembly, the controller may selectively present a live camera feed from the camera on the display device for viewing by an operator. In certain implementations, the controller may automatically (that is, without requiring operator input) display or offer to display the live camera feed from the 3D imaging device when determining, based upon the pertinent 3D imaging data, that there exists an undesirably high debris accumulation risk level within a monitored debris-gathering region or compartment. This action (the presentation or offered presentation of a live camera feed encompassing an area in which an excessive FOD build-up is detected) is an example of a countermeasures that may be automatically performed by the controller to address excessive FOD accumulations. Other examples of countermeasures suitably performed when the debris accumulation risk level surpasses a predetermined threshold value include the activation or intensification of (i) any auxiliary debris clearance devices (e.g., air impingement systems) present in the region(s) in which an excessive FOD accumulation is detected, or (ii) cooling mechanism capable of lowering peak surface temperatures within monitored regions, if applicable. Further, in instances in which the debris accumulation risk level surpasses higher threshold values, such as an upper critical threshold, certain functions of the work vehicle may be inhibited; the term "inhibited," as appearing in this context, denoting the temporary disablement of a work vehicle function or limiting the work vehicle function in some manner. By way of non-limiting example, the work vehicle engine may be de-rated to reduce temperatures (should the problematic FOD build-up occur within the engine compartment or another associated region of the work vehicle); any aftertreatment regeneration functions may be disabled or postponed; and, in severe cases, the usage of an implement or articulable portion of the work vehicle may be disabled, slowed, or otherwise inhibited.

Additional description of an example debris accumulation control system deployed onboard a work vehicle will now be discussed in connection with FIGS. 1-8. While the example debris accumulation control system is described below in the context of a particular type of work vehicle (namely, a wheel loader), embodiments of the debris accumulation control system can be utilized onboard numerous different types of work vehicles. In this regard, embodiments of the debris accumulation control system may be beneficially integrated into any work vehicle containing a powertrain susceptible to FOD-induced fires, particularly those work vehicles routinely operated in ambient environments containing relatively large amounts of airborne combustible debris. A non-exhaustive list of work vehicles into which embodiments of the debris accumulation control system may be usefully integrated includes other types of harvesting equipment, such as tractors, combine harvester, and cotton harvesters; forestry work vehicles, such as feller bunchers; and construction work vehicles including loaders, dozers, excavators, and motor graders, particularly when operating in environments containing combustible particulate matter that may become airborne and accumulate within work vehicle compartments.

Wheel Loader Equipped with an Example Debris Accumulation Control System

Referring initially to FIG. 1, an example work vehicle (here, a wheel loader 20) equipped with a debris accumulation control system 22 is presented. In addition to the debris accumulation control system 22, the example wheel loader 20 includes a front end loader (FEL) assembly 24 terminating in a tool or implement, such an FEL bucket 26. The FEL assembly 24 is considered a type of "boom assembly" in the present context, as is the hinged boom assembly of an excavator, a backhoe, or a feller-buncher. The FEL assembly 24 is mounted to a main body or chassis 28 of the wheel loader 20, extending therefrom in a forward direction. A cabin 30 is located above a forward portion of the main chassis 28 and encloses an operator station containing a seat, operator controls, and other devices. A number of ground engaging wheels 32 support the main chassis 28. In this particular example, the wheel loader 20 has an articulated body such that a forward portion or frame 34 of the loader 20 can rotate relative to the main chassis 28 about an axis 36 (FIG. 1). The FEL assembly 24 is mounted to the forward frame 34 of the wheel loader 20, which may contain an internal compartment susceptible to FOD build-up as described below in connection with FIG. 4.

The FEL assembly 24 of the wheel loader 20 contains twin booms or lift arms 38, which extend from the main chassis 28 in a forward direction to the backside of the FEL bucket 26. At one end, each lift arm 38 is joined to the forward loader frame 34 of the wheel loader via a first pin or pivot joint 40. At a second, longitudinally-opposed end, each lift arm 38 is joined to the FEL bucket 26 via a second pin or pivot joint 42. Two lift arm cylinders (hidden from view) are further mounted between the forward loader frame 34 of the wheel loader 20 and the lift arms 38. Extension of the lift arm cylinders results in rotation of the lift arms 38 about the pivot joints 40 and upward motion of the FEL bucket 26. The wheel loader 20 also includes a bucket cylinder 46, which is mechanically coupled between the forward loader frame 34 and a linkage 48. A central portion of the linkage 48 is, in turn, rotatably or pivotally mounted between the lift arms 38, while an end portion of the linkage is pivotally joined to the FEL bucket 26 opposite the bucket cylinder 46. The linkage 48 may be a four bar linkage, a Z-linkage, or a similar linkage suitable for converting translation of the bucket cylinder 46 into rotation (curling or uncurling) of the FEL bucket 26. The wheel loader 20 further includes an engine compartment 44 in which an engine is located, as discussed below in connection with FIG. 2.

As schematically depicted in an upper portion of FIG. 1, the debris accumulation control system 22 includes a controller 50 to which one or more 3D imaging device 52 are operably coupled; that is, coupled in a manner permitting signal communication from the 3D imagining device(s) to the controller 50. The controller 50 is further operably coupled to one or more actuated components 54, a display device 56, and any number of additional data sources 58 included in the debris accumulation control system 22. The connections between the controller 50 and the various other components 52, 54, 56, 58 of the debris accumulation control system 22 are denoted by signal communication lines 60, which may represent wireless connections, wired connections, or any combination thereof. The controller 50 of the debris accumulation control system 22 can assume any form suitable for performing the functions described throughout this document. The term "controller," as appearing herein, is utilized in a non-limiting sense to generally refer to the processing architecture of debris accumulation control system 22. The controller 50 can encompass or may be associated with any practical number of processors (central and graphical processing units), control computers, navigational equipment pieces, computer-readable memories, power supplies, storage devices, interface cards, and other standardized components.

The controller 50 of the debris accumulation control system 22 may include or cooperate with any number of firmware and software programs or computer-readable instructions designed to carry-out the various process tasks, calculations, and control/display functions described herein. Such computer-readable instructions may be stored within a non-volatile sector of a memory 62 associated with the controller 50. While generically illustrated in FIG. 1 as a single block, the memory 62 can encompass any number and type of storage media suitable for storing computer-readable code or instructions, as well as other data utilized to support the operation of the debris accumulation control system 22. The memory 62 may be integrated into the controller 50 in embodiments as, for example, a system-in-package, a system-on-a-chip, or another type of microelectronic package or module. Other types of data may also be stored in the memory 62 and utilized in performing the below-described debris accumulation assessment processes; e.g., as indicated in FIG. 1, the memory 62 may store baseline map data 64 defining the general 3D contours or external topology of the work vehicle infrastructure within the FOV or FOVs of the below-described 3D imaging devices 52. Specifically, in at least some implementations, the baseline map data 64 may include 3D imaging data captured by the 3D imaging device(s) 52 of infrastructure within monitored region(s) of one or more work vehicle compartments 66. In embodiments, the memory 62 may store other data 68 utilized in performing the processes or algorithms described below, such as data correlating different risk levels with different zones within the respective FOVs of the 3D imaging devices 52, with different ambient environment conditions, or with other relevant parameters. The memory 62 may also store data storing operator preferences regarding the below-described debris accumulation processes in at least some embodiments.

An output of the controller 50 is coupled to an input of the display device 56 such the controller 50 may provide video signals, and possibly audio signals, to the display device 56 as appropriate to generate imagery thereon. The display device 56 may assume the form of any image-generating device suitable for usage onboard the wheel loader 20 and may or may not have touchscreen capabilities. The display device 56 may be affixed to the static structure of the operator cabin 30 and realized in a head-down display (HDD) configuration in embodiments. In other implementations, the display device 56 can assume the form of a portable electronic display device, such as a tablet computer or laptop, which is carried into the operator station (e.g., the cabin 30 of the wheel loader 20) by an operator and which communicates with the various other components of the work vehicle debris accumulation control system 22 over a physical connection or wireless connection to perform the below-described display functionalities.

The debris accumulation control system 22 further includes an operator interface 70, which is operably coupled to (in signal communication with) the controller 50. The operator interface 70 can be any device or group of devices utilized by an operator of the wheel loader 12 to input data into or to otherwise control the debris accumulation control system 22. In various implementations, the operator interface 70 may be integrated into or may be otherwise associated with the display device 52. In this regard, the operator interface 70 may include physical inputs (e.g. buttons, switches, dials, or the like) located on or proximate the display device 56, a touchscreen module integrated into the display device 56, or a cursor input device (e.g., a joystick, trackball, or mouse) for positioning a cursor utilized to interface with graphic user interface (GUI) elements generated on the display device 56. It should be understood that the operator interface 70, then, may include any number and type of operator input devices for receiving operator input commands including devices for interacting with GUIs, for receiving verbal input or voice commands, and/or for recognizing operator gesture commands, to list but a few examples.

The debris accumulation control system 22 may further include any number of additional sensors 72 (that is, sensors other than the 3D imaging devices 52) providing data inputs utilized in the example debris accumulation control process described below in connection with FIG. 5. In this regard, such additional sensors 72 may provide data regarding ambient conditions (e.g., ambient temperatures and atmospheric moisture levels) and/or information regarding measured temperatures within the wheel loader 20, such as local engine or exhaust temperatures. Similarly, the actuated components 54 can include any number and type of work vehicle components, the operation of which can be controlled by or influenced by the controller 50 in performing any of the below-described excessive debris countermeasures. Accordingly, the actuated components 54 of the wheel loader 20 may include those components or systems animating FEL assembly 24 (e.g., an electrohydraulic (EH) actuation system in which bucket cylinder 46 and the non-illustrated lift arm cylinders are included); those components influencing operation of the work vehicle engine and allowing the engine to be selectively de-rated (e.g., valves controlling the metering of fuel and/or airflow into the engine); any components or mechanisms onboard the wheel loader 20 utilized to cool heated surfaces against which FOD may collect; any components or mechanisms (e.g., airflow impingement devices) onboard the wheel loader 20 utilized to displace or dislodge FOD accumulations within work vehicle compartments; aftertreatment regeneration subsystems; and other components involved in operation of the work vehicle.

The illustrated debris accumulation control system 22 includes one or more 3D imaging devices 52, which are installed within the wheel loader 20 at locations suitable for monitoring selected debris-gathering regions within one or more compartments 66 of the example loader 20. As discussed above, a given 3D imaging device 52 can assume the form of any sensor or sensor assembly capable of gathering depth data for spatial points within the FOV of the device 52. Examples of suitable devices for usage as 3D imaging devices 52 include stereoscopic camera assemblies, acoustic or sonar (e.g., ultrasound) sensor arrays, and short range radar sensor arrays. Other depth-sensing imaging devices can also be employed, such as light emitting diode (LED) sensors similar to those utilized in collision avoidance systems; however, it may be desirable to avoid the usage of sensor types having temperature limitations in embodiments, particularly when one or more 3D imaging devices 52 are deployed within the engine compartment 44 or another high temperature compartment of the wheel loader 20. In certain cases, a camera may also be paired with an acoustic or radar sensor array to provide both a live feed of the monitored region and corresponding depth measurements. Further, any practical number of 3D imaging devices 52 may be deployed onboard a given work vehicle (here, the example wheel loader 20) as appropriate to monitor the debris-gathering regions of concern. Depending upon the mounting location and FOV of a given 3D imaging device 52, a single 3D imaging device 52 may be capable of concurrently monitoring multiple debris-gathering regions within a given work vehicle compartment. In certain instances, multiple 3D imaging devices 52 may be distributed throughout the work vehicle and utilized to monitor FOD accumulation within multiple work vehicle compartments. Additional examples of work vehicle compartments and debris-gathering regions within the wheel loader 20 usefully monitored by the debris accumulation control system 22 will now be discussed in connection with FIGS. 2-4.

Figure 2:
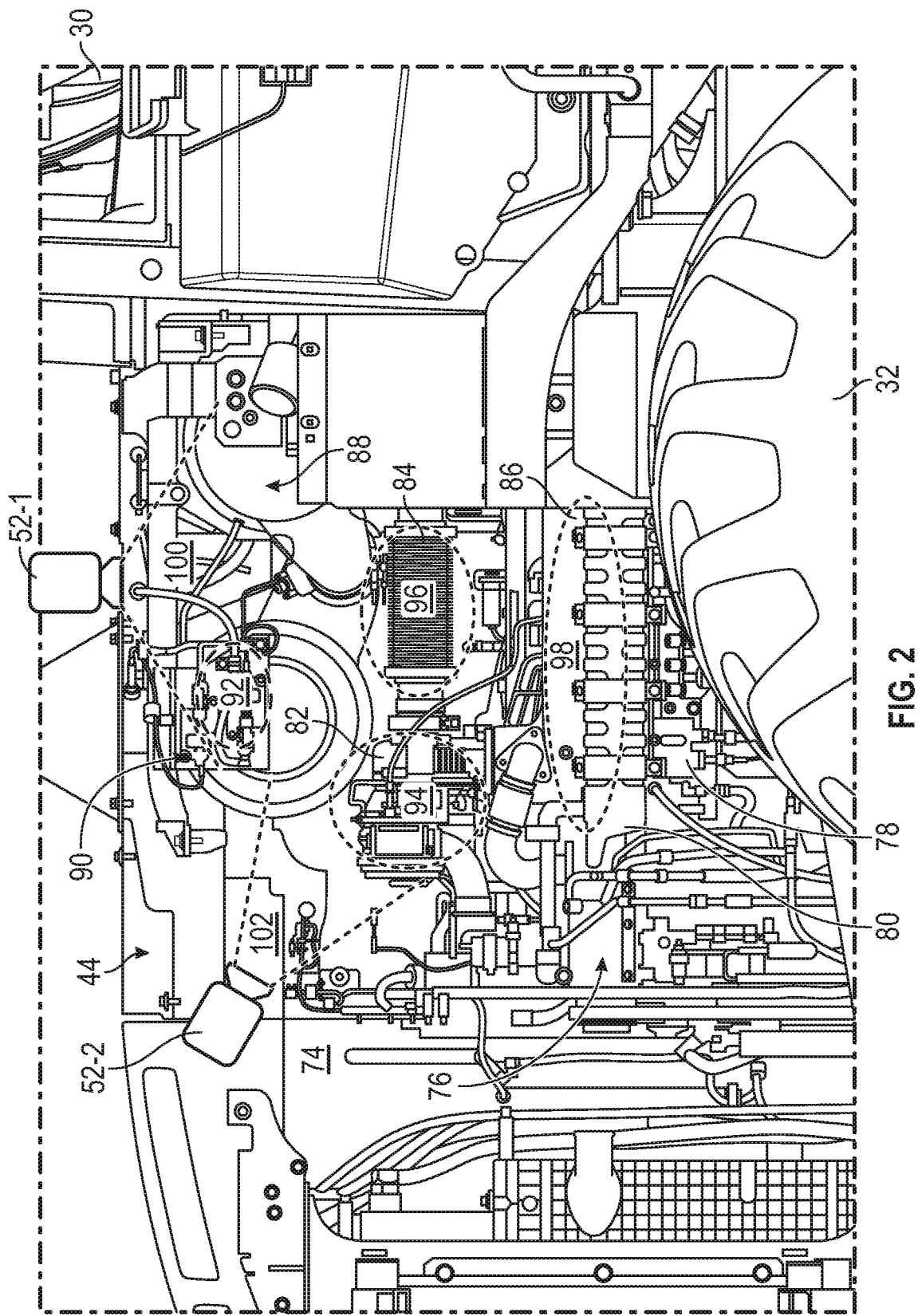
FIGS. 2-4 are cross-sectional views taken through different compartments of the wheel loader of FIG. 1, which identify debris-gathering regions contained within the work vehicle compartments and usefully monitored by the example debris accumulation control system for the presence of excessive debris build-up.

FIG. 2 is a cross-sectional view taken through the engine compartment 44 of the example wheel loader 20. Housed within the interior 74 of the engine compartment 44, a heavy duty diesel engine 76 including a lower engine block or body 78, an Exhaust Gas Recirculation (EGR) cooler 80 attached (bolted) to the upper surface of the engine block 78 to which a header assembly is bolted or otherwise attached, and a turbocharger 82. Collectively, these components and the other components directly associated with the engine 76 may be referred to as an "engine assembly." A flexible exhaust tube 84 conducts exhaust, which is received from an exhaust manifold 86 of the diesel engine 76, to aftertreatment stages 88, 90 before expulsion from the work vehicle. Within the first aftertreatment stage 88, the exhaust is exposed to a diesel oxidation catalyst (DOC) and subsequently directed through a diesel particulate filter (DPF) to remove particulate contaminants entrained within the exhaust stream. The DPF may foul over time and be periodically cleaned through regeneration cycles during which the DPF is bathed in high temperature gas flow to thermally decompose or "burn out" organic matter trapped in the DPF. In the second aftertreatment stage 90, the exhaust is subject to selective catalytic reduction (SCR) for further emission control, such as reduction of nitrogen oxide species (nitric oxide and nitric dioxide) entrained in the exhaust expelled from the wheel loader 20.

Despite the relatively enclosed nature of the wheel loader engine compartment 44, airborne particulate debris and other FOD may be ingested into the engine compartment 44 and aggregate on certain surfaces, at least some of which may be heated to relatively high temperatures during engine operation and pose an increased fire risk. Any number and type of 3D imaging devices 52 may be positioned to monitor one or more regions or areas within the engine compartment 44, which are prone to debris accumulation (e.g., due to complex external geometries, due to the presence of bolts or other mating interfaces, or due to airflow patterns or dead zones permitting the aggregation of debris in certain regions) and/or which are heated to highly elevated external temperatures during work vehicle operation. Examples of such locations are denoted in FIG. 2 by four dashed circles 92, 94, 96, 98. Specifically, the dashed circles 92, 94, 96, 98 identify debris-collection regions containing external surface regions of the second aftertreatment (SCR) stage 90 (circle 92), of the turbocharger 82 (circle 94), of the flexible exhaust tube 84 (circle 96), and mounting interface of the header assembly or EGR cooler 80 (circle 98). In further embodiments, different debris-gathering regions may be monitored by the debris accumulation control system 22, such as external regions of the first aftertreatment (DOC, DPF) stage 88.

The particular number and mounting location of the 3D imaging devices 52 utilized to monitor the debris-gathering regions 92, 94, 96, 98 will vary among embodiments. However, by way of non-limiting example, the general positioning of two 3D imaging devices 52-1, 52-2 is schematically shown in FIG. 2. In this example, a first 3D imaging device 52-1 is mounted in an upper region of the engine compartment 44 such that the FOV 100 of the device 52-1 encompasses at least debris-gathering regions 92, 94, 96 and, perhaps, the debris-gathering region 98 if not visually blocked by the flexible exhaust tube 84. Similarly, the second 3D imaging device 52-2 may be mounted in an upper, forward portion of the engine compartment 44 and angled such that the FOV 102 of the imaging device 52-2 encompasses at least the debris-gathering regions 94, 96, 98, in whole or in part. In this manner, the 3D imaging devices 52-1, 52-2 may be strategically positioned and/or configuration to monitor relatively large zones of the engine compartment 44 in embodiments to, for example, minimize the number of 3D imaging devices required to monitor the debris-gathering regions of interest. For example, when one or both of the 3D imaging devices 52-1, 52-2 contain at least one camera (e.g., included in a stereoscopic camera assembly), the camera may be furnished with a wide angle lens.

Figure 3:
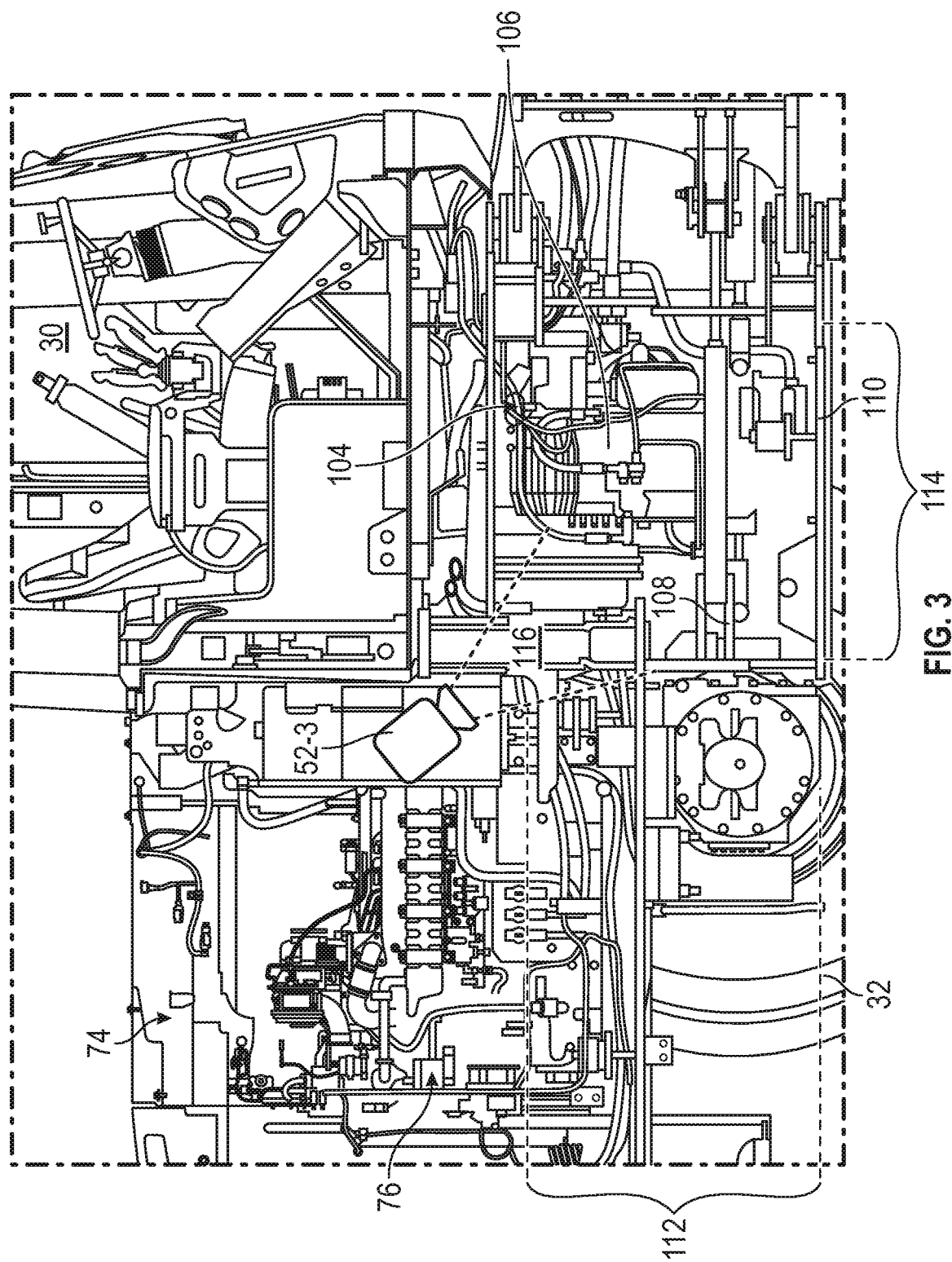

FIG. 3 is a cross-sectional view taken through a transmission compartment 104 of the example wheel loader 20. In this example, the transmission compartment 104 contains a transmission 106, which receives rotating power from the work vehicle engine 76 and supplies mechanical power to the driven wheels 32 through one or more drive shafts 108. The transmission compartment 104 is at least partially enclosed by surrounding structural walls or infrastructure, including a frame bottom guard 110. As depicted, examples of debris-gathering regions desirably monitored for FOD build-up in this compartment (here, denoted by brackets for illustrative clarity) may include: (i) a first debris-gathering region 112 encompassing surfaces of the transmission 106 and the rotating drive shaft 108, and (ii) a second debris-gathering region 114 encompassing the floor of the compartment 104 or, stated differently, the upper surface of the frame bottom guard 110. In this case, FOD accumulations within the debris-gathering regions 112, 114 may not be exposed to surface temperatures reaching the thermal extremes encountered within the engine compartment 44. Nonetheless, such debris-gathering regions 112, 114 may be desirably monitored due to the possibility of spark generation (e.g., due to rubbing action of the drive shaft 108 against static components) and/or may be prone to the accumulation of relatively large volumes of debris (particularly in the case of the debris-gathering region 114 bounded by the floor or bottom surface of the compartment 104). Consequently, one or more of the 3D imaging devices 52 included within the debris accumulation control system 22 (FIG. 1) may be positioned to monitor debris accumulation within these regions 112, 114. For example, as symbolically shown in a central portion of FIG. 3, a single 3D imaging device 52-3 may be mounted at a location sufficient to place both debris-gathering regions 112, 114 within the FOV 116 of the imaging device 52-3.

Figure 4:
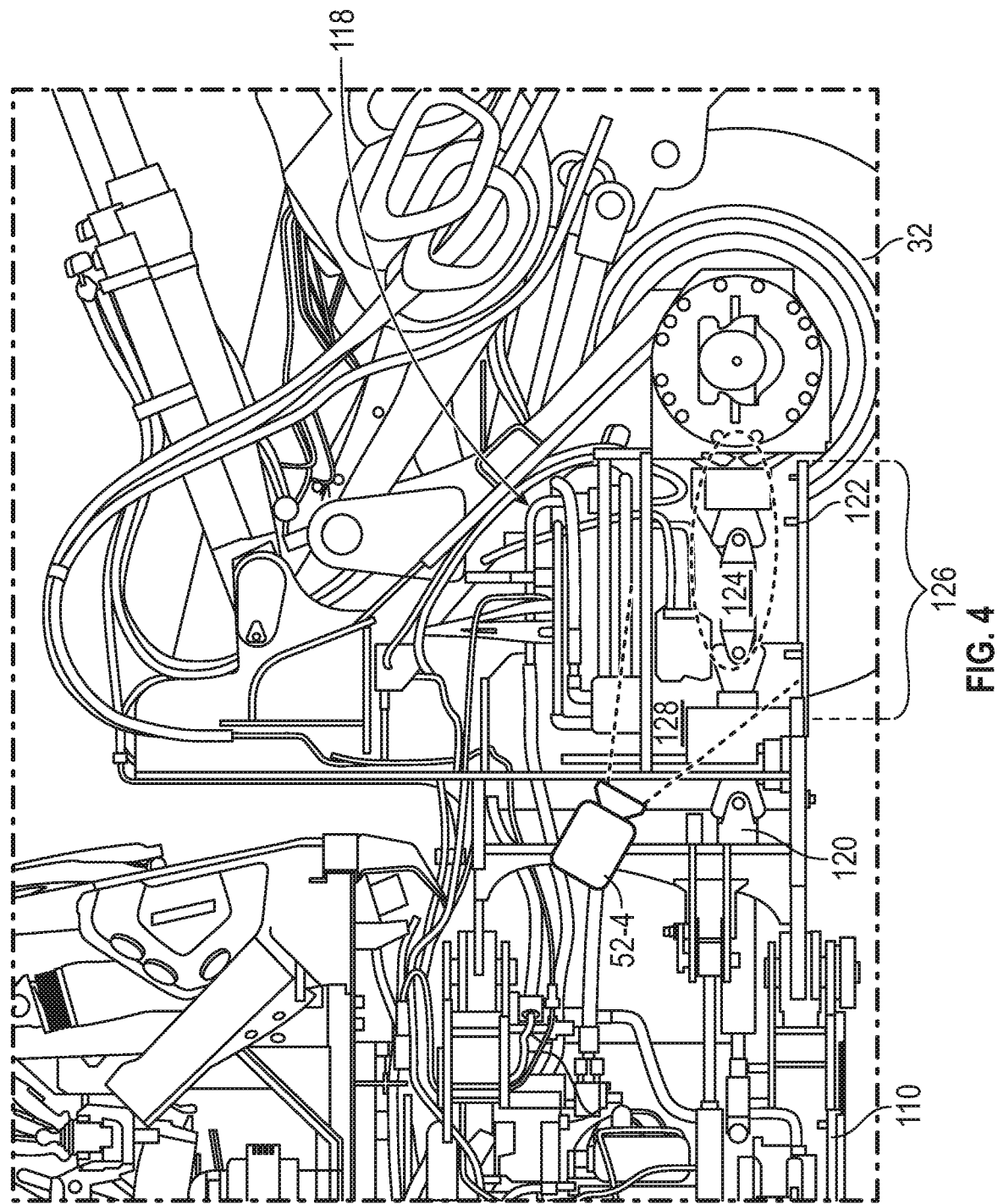

Addressing next FIG. 4, a forward frame compartment 118 located within the forward loader frame 34 of the wheel loader 20 is shown in cross-section. In a manner similar to the above-described transmission compartment 104, the forward frame compartment 118 of the wheel loader 20 is enclosed by structural walls including, for example, a loader frame bottom guard 122. The loader frame bottom guard 122 has an upper principal surface, which partially defines the bottom or floor of the compartment 118. A drive shaft 120 extends into the forward frame compartment 118 to transmit rotational power from the work vehicle engine 76 (FIG. 2), through the transmission 106 (FIG. 3), and to the forward wheel set 32 of the wheel loader 20. As further by a dashed circle and a bracket, respectively, first and second debris-gathering regions 124, 126 are contained within the forward frame compartment 118 and desirably monitored utilizing the debris accumulation control system 22. Accordingly, a 3D imaging device 52-4 may be positioned within or adjacent the forward frame compartment 118, with the FOV 128 of the 3D imaging device 52-4 encompassing a majority, if not a substantial entirety of the debris-gathering regions 124, 126.

In example of FIG. 4, the first debris-gathering region 124 encompasses or borders at least a portion of the drive shaft 120 and, perhaps, an interface at which the drive shaft 120 is supported by a static component and one or more bearing assemblies. The debris-gathering region 124 may be prone to debris accumulation due to the various mating interfaces between component and relatively complex external geometries in this region. Additionally, as indicated above, the interface between a rapidly-rotating component (here, the drive shaft 120) and the surrounding static infrastructure provides an increased opportunity for spark generation should intermittent contact or rubbing occur at this interface. Similarly, a second, adjacent debris-gathering region 126 is bordered by or encompasses the loader frame bottom guard 122. The debris-gathering region 126 may be desirably monitored for FOD build-up given the propensity of the bottom guard 122 to serve as a shelf or ledge on which relatively large amount of FOD may deposit. Again, the forward frame compartment 118 is remotely located from the engine compartment 44 (FIG. 2) of the wheel loader 20 and, therefore, isolated from the peak temperatures occurring within the engine compartment 44. However, ignition of FOD accumulations (particularly if relatively voluminous) is still possible within the debris-gathering region 126 due to the above-described potential for spark generation (or, in rare instances, from electrical arcing) and/or due to the possible infiltration of an externally-generated ignition source (e.g., a spark or ember from the ambient environment) into the forward frame compartment 118.

Several example debris-gathering regions within compartments of a work vehicle (i.e., the wheel loader 20) have thus been described in connection with FIGS. 2-4. Embodiments of the debris accumulation control system 22 can monitor any or all of the above-described debris-gathering regions 92, 94, 96, 98, 112, 114, 124, 126, as well as other debris-gathering regions distributed throughout the interior of the wheel loader 20. While the example debris accumulation control system 22 is described above in the context of a construction work vehicle (wheel loader 20), further embodiments of the example debris accumulation control system 22 may be usefully integrated into work vehicles employed in the agriculture and forestry industries and prone to the ingestion of plant matter and other combustible organic materials. Similarly, embodiments of the debris accumulation control system 22 can be integrated into work vehicles utilized in mining industries and in work environments containing particulate materials, such as coal dust or agricultural materials (e.g., fertilizers or chemicals), capable of combustion.

Figure 5:
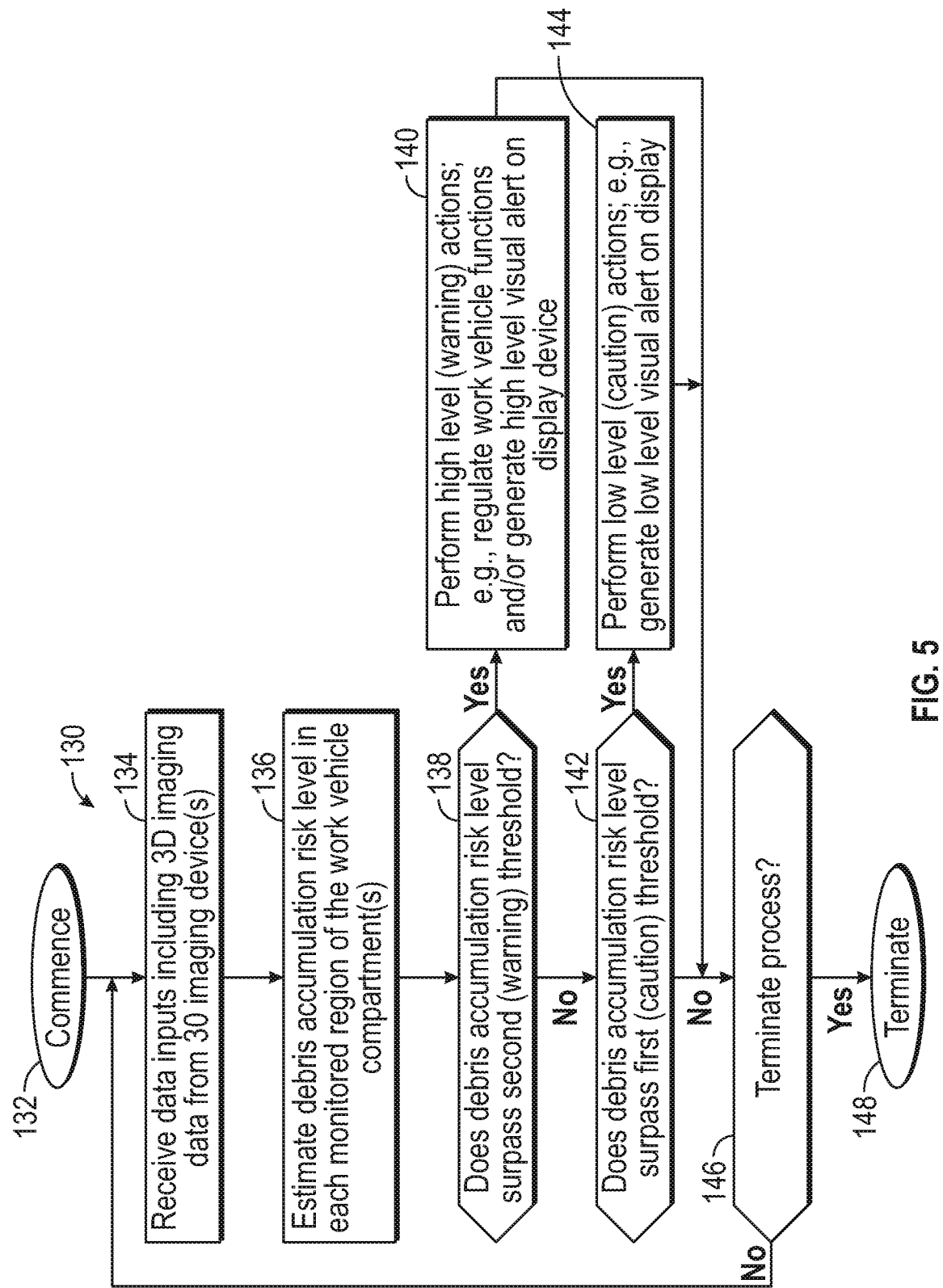
FIG. 5 is a flowchart illustrating an example debris accumulation control process suitably carried-out by the controller of the debris accumulation control system shown in FIG. 1 in embodiments.

Turning to FIG. 5, there is shown an example process 130 suitably carried-out by the controller 50 of the above-described debris accumulation control system 22 to monitor FOD accumulation within one or more work vehicle compartments utilizing data provided by one or more 3D imaging devices; assess the risk posed by such FOD accumulation; and then execute selected actions or countermeasures to address such FOD accumulations. The illustrated example process 130 (hereafter, the "debris accumulation control process 130") includes a number of process STEPS 132, 134, 136, 138, 140, 142, 144, 146, 148, each of which is described, in turn, below. Depending upon the particular manner in which the debris accumulation control process 130 is implemented, each step generically illustrated in FIG. 5 may entail a single process or multiple sub-processes. Further, the steps illustrated in FIG. 5 and described below are provided by way of non-limiting example only. In alternative embodiments of the debris accumulation control process 130, additional process steps may be performed, certain steps may be omitted, and/or the illustrated process steps may be performed in alternative sequences. For consistency, the following will describe the debris accumulation control process 130 in the context of the example wheel loader 20 described above in conjunction with FIG. 1. This notwithstanding, embodiments of the debris accumulation control process 130 can be carried-out by the debris accumulation control system 22 (and variants thereof) when deployed onboard any type of work vehicle having at least one compartment prone to the undesirable accumulation of FOD.

The example debris accumulation control process 130 commences at STEP 132 in response to the occurrence of a predetermined trigger event. In embodiments, the trigger event can be startup of a work vehicle (e.g., the wheel loader 20 shown in FIG. 1) or, instead, entry of operator input requesting performance of the debris accumulation control process 130. In other instances, the controller 50 may automatically initiate the debris accumulation control process 130 in response to certain detected conditions. Examples of such conditions may include when predetermined temperature thresholds are surpassed by temperatures sensed within the work vehicle engine (e.g., engine temperatures) or when predetermined ambient conditions are satisfied; e.g., when ambient temperatures are relatively high and/or when atmospheric moisture levels are relatively low. In still other instances, the controller 50 may commence the debris accumulation control process 130 when determining that the work vehicle is actively engaged in a work task likely to generate relatively large amounts of combustible FOD, which may become airborne and may be ingested into the work vehicle. Such work tasks may include harvesting tasks (in the case of combine or other agriculture work vehicle), tree felling tasks (in the case of a feller-buncher), excavation tasks (in the case of a work vehicle involved in the construction or mining industries), and material transfer tasks (again, in the case of a work vehicle involved in the construction or mining industries).

After commencing the debris accumulation control process 130, the controller 50 advances to STEP 134 and collects pertinent data inputs utilized to perform the subsequent steps of the process 130. The data inputs collected during STEP 134 include current 3D imaging data from the 3D imaging device or devices 52 onboard wheel loader 20 (FIG. 1) or other work vehicle. Again, the 3D imaging data provided by each 3D imaging device 52 includes depth data indicative of the surface topology across the entirety or at least a portion of the FOV of the device. The 3D imaging devices 52 may also provide other data useful in carrying-out the process 130 in embodiments, such as thermal data when the 3D imaging device includes an infrared camera or is otherwise capable of capturing thermal data. The 3D imaging devices 52 may also provide video feed in embodiments suitable for performing image analysis techniques to monitor debris accumulation in other manners complementary to calculating debris accumulation volumes. For example, in embodiments, the controller 50 may further analyze a video feed from any given 3D imaging device to determine whether distinct structural features of the monitored infrastructure are obscured or covered by FOD accumulation at a given juncture in time. Notably, in embodiments, the controller 50 may also store a debris accumulation progression video (e.g., a time-lapse video) in the memory 62, with the progression video compiled from the 3D imaging data provided by the 3D imaging sensor over a period of time. Such a video may be stored for a predetermined time period, recorded over or replaced at a predetermined time interval (e.g., after a set number of operating hours) and accessed for diagnostic purposes as desired.

Various other items of information may also be collected during STEP 134, such operator input data. Such operator input may specify a sensitivity level of the debris accumulation control process 130; e.g., operator settings adjusting the below-described thresholds upwardly or downwardly. Additionally or alternatively, operator input may specify a material currently processed by the work vehicle and, thus, indicate a FOD type present in the ambient environment, which may be considered by the controller 50 in calculating the below-described debris accumulation risk level. In still other instances, operator input received via the operator interface 70 may provide any other information (e.g., information describing meteorological conditions) usefully considered in evaluating the fire risk posed by FOD accumulations within the work vehicle into which the debris accumulation control system 22 is integrated. So too may the controller 50 gather other sensor inputs during STEP 134 from the various other sensors 72 onboard the wheel loader 20 (or other work vehicle). Such other sensor inputs can include any combination of temperature sensor data of internal peak temperatures within the work vehicle, sensor data indicative of prevailing ambient weather conditions (e.g., ambient temperature and moisture conditions), sensor data identifying a type of material currently processed or handled by the work vehicle, and perhaps any global position system (GPS) data indicative of operation of the work vehicle in a geographical region or work area associated with an increased risk of FOD-induced fires.

Next, at STEP 136 of the debris accumulation control process 130, the controller 50 estimates a debris accumulation risk level in each monitored region of the work vehicle compartment(s). In this regard, the controller 50 of the debris accumulation control system 22 may calculate a debris accumulation volume in one or more debris-gathering region of a work vehicle compartment based, at least in part, on the 3D imaging data provided by the 3D imaging device. The controller 50 may then estimate the debris accumulation risk level based, at least in part, on the estimated debris accumulation volume within the monitored work vehicle compartment(s). The controller 50 may render such debris accumulation volume estimates by comparing the currently-collected (e.g., real-time or near real-time) 3D imaging data with the baseline map data, which provides a baseline topology or 3D geometry of the infrastructure within the monitored regions within a clean or essentially-debris free state. Various other processing functionalities may also be performed by the controller 50, such as algorithms to resolve signal noise; e.g., false depth measures resulting from airborne debris circulating within the work vehicle compartment at issue. Using this data, perhaps combined with other data inputs (e.g., one or more of the secondary factors), the controller 50 may then estimate a debris accumulation risk level for each work vehicle compartment under consideration or, perhaps, for each debris-gathering region within a given work vehicle compartment. Secondary factors that may be considered by the controller 50 in arriving at the debris accumulation risk level can include the combustibility or other characteristics of the FOD at issue (if known), ambient weather conditions, current work vehicle operating parameters, and any relevant operator input data. With respect to operator input data, operator customization settings may be considered indicating a desired sensitivity of the debris accumulation control system 22. Additionally, the controller 50 may consider any operator input entered into the debris accumulation control system 22 via the operator interface 70 indicating that the work vehicle is operated in high risk work environment; e.g., an operational environment in which embers are routinely generated (e.g., due to a nearby controlled burn) or characterized by high levels of combustible airborne FOD.

Figure 6:
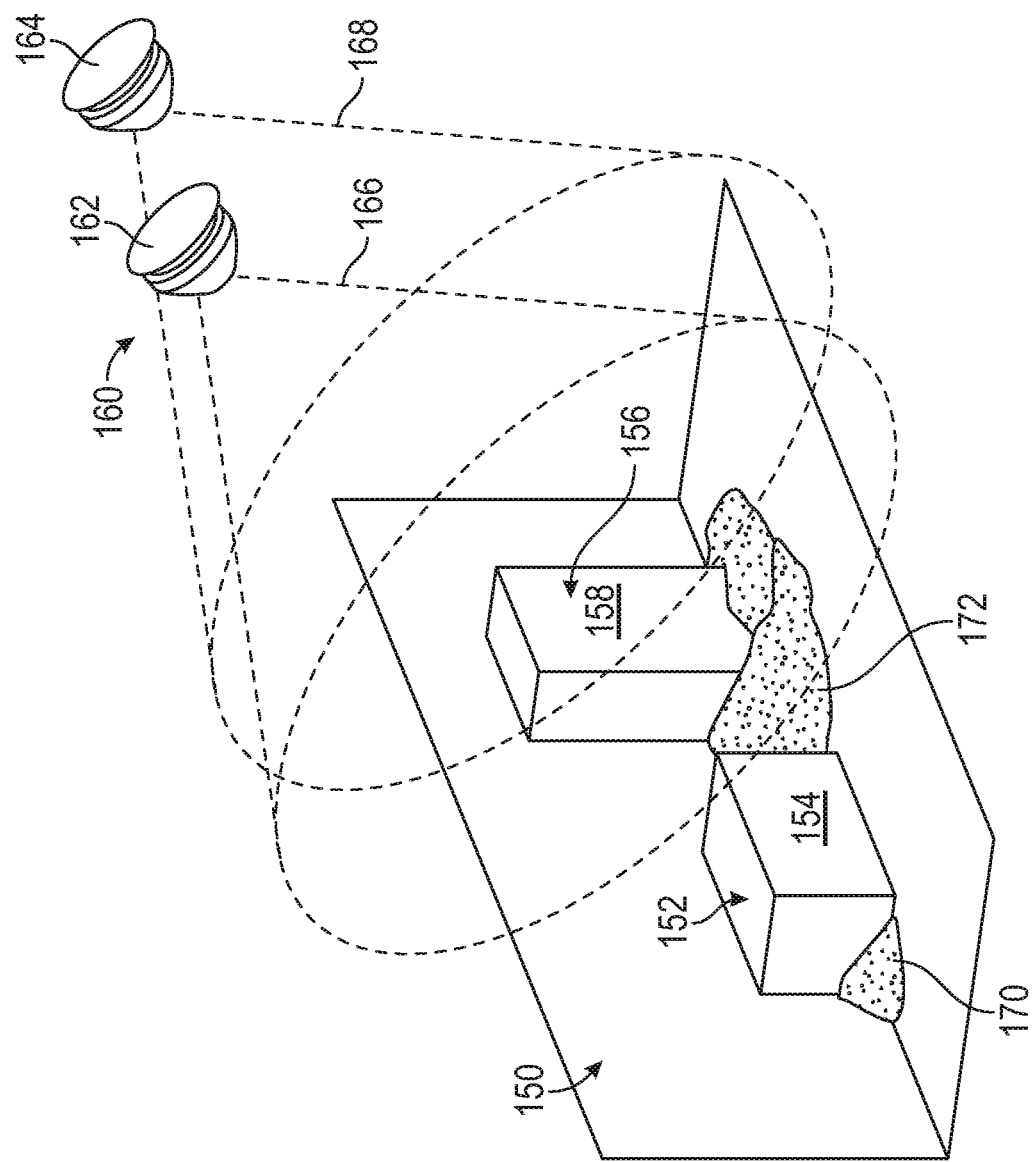

In at least some embodiments, the controller 50 may also consider historical data collected by the 3D imaging devices 52 in assessing the debris accumulation risk level; e.g., in certain cases, the controller 50 may track the 3D imaging data over time to monitor a rate of debris accumulation within the debris-gathering region of the work vehicle compartment; and subsequently estimate the debris accumulation risk level based, at least in part, on the monitored rate of debris accumulation. Additionally or alternatively, in embodiments in which the memory 62 further stores map data defining categorized risk zones within the FOV of a given 3D imaging device, the controller 50 may further: (i) determine a debris accumulation distribution within the work vehicle compartment utilizing the 3D image data; and (ii) estimate the debris accumulation risk level based, at least in part, on the debris accumulation distribution relative to the categorized risk zones. Consider, in this latter regard, FIGS. 6-8 illustrating a generalized work vehicle compartment 150 including first and second debris-gathering regions 152, 156 in which first and second component 154, 158 are at least partially located, respectively. The debris-gathering regions 152, 156 may be assigned different debris sensitivity levels or different risk zone categories, as discussed below. Further, FOD build-up within debris-gathering regions 152, 156 may be monitored by a 3D imaging device (e.g., a stereoscopic camera assembly 160) including first and second cameras 162, 164 having overlapping conical FOVs 166, 168, respectively.

In examples of FIGS. 6-8, the first debris-gathering region 152 within the work vehicle compartment 150 may be located in a high risk zone (e.g., due to higher peak surface temperatures commonly occurring about the exterior surfaces of the high temperature component 154), while the second debris-gathering region 156 may be located in a lower risk zone (e.g., due to lower peak surface temperatures occurring along the exterior of the component 158). In each of the example scenarios, one or more bodies of FOD 170 have accumulated within the first debris-gathering region 152 and contact the high temperature component 154. Similarly, FOD 172 has accumulated within the second debris-gathering region 156 and contact the low temperature component 154. The total volume of the FOD accumulation 170, 172 in the scenario of FIG. 6 may be greater than or substantially equivalent to the total volume of the FOD accumulation 170, 172 shown in example scenario FIG. 7. Despite this similarity, the controller 50 may assign a lower debris accumulation risk level to the work vehicle compartment 150 in the example scenario of FIG. 6 due to the distribution of the FOD accumulation 170, 172 as compared to the example scenario of FIG. 7. In particular, the controller 50 may determine from analysis of the 3D imaging data provided by the stereoscopic camera assembly 160 that a higher volume of debris accumulation is present within the first debris-gathering region 152 in the example of FIG. 7. The controller 50 may further determine from stored data that the debris-gathering region 152 falls within a high risk category, while the adjacent debris-gathering region 156 falls within a lower risk category. Combining this information, the controller 50 may determine from the volumetric distribution of the FOD accumulation 170, 172 that the example scenario shown in FIG. 7 warrants a higher debris accumulation risk level.

In embodiments, the controller 50 of the debris accumulation control system 22 may render the above-described debris accumulation risk level assessments utilizing the baseline map data stored in the memory 62. The usage of such baseline map data increases accuracy in assessing the volume and distribution (if considered) of FOD build-up adjacent and over the existing infrastructure of the work vehicle at any given juncture in time. Notably, and as indicated in the cross-section of FIG. 8, such baseline map data enables the controller 50 to estimate the volumetric FOD build-up even when components or structural features of the work vehicle infrastructure may be partially or wholly buried by the debris accumulation within the monitored region(s) of the work vehicle compartment. In still other instances, the debris accumulation distribution and the other secondary factors described above may not be considered by the controller 50 in assessing the debris accumulation risk level within a work vehicle compartment, in which case the debris accumulation risk level may be based entirely or principally upon the estimated debris accumulation volume within a given compartment or monitored region.

After calculating an estimated debris accumulation risk level during STEP 136 of the process 130, the controller 50 advances to STEP 138 and determines whether the debris accumulation risk level surpasses a high level (e.g., critical) threshold value. If this is the case, the controller 50 progresses to STEP 140 of the process 130 and generates a high level visual alert or notification on the display device 56. Such a high level visual alert may be generated in a manner intended to rapidly bring the alert to an operator's attention. Such an alert may include text or symbology presented in a prominent manner on the display screen of the display device 56. Color coding (e.g., shading of the alert in red or another warning color) and animation effects (e.g., flashing) may be applied, as desired. Accompanying audible or haptic alerts may also be generated. In addition to conveying a relatively high level of urgency, the visual alert generated on the display device 56 may also indicate (e.g., in text or by symbology) the rationale underlying the excessive debris accumulation alert and, perhaps, may further convey the general location within the work vehicle in which the excessive debris accumulation has been detected. In certain instances, maintenance may be automatically scheduled for the wheel excavator 20 or flags may be stored in the memory 62 to clean the compartment or compartment(s) in which the excessive debris accumulation has been detected. Corresponding alerts may also be sent to network-connected devices remote from the work vehicle in at least some instances.

With continued reference to the debris accumulation control process 130 (FIG. 5), any number of excessive debris countermeasures may be performed in addition to or in lieu of the high level visual alert generated on display device 56 during STEP 140. Such excessive debris countermeasures can include actions taken to reduce local temperatures within the engine compartment containing the excessive FOD accumulation or to temporarily prevent work vehicle actions or functions (e.g., regeneration events) resulting in the generation of such highly elevated temperatures. Generally, such temperature-limiting countermeasures are useful when the excessive FOD accumulation occurs within a work vehicle compartment containing high temperature components, such as the above-described engine compartment 44 of the wheel excavator 20. In this case, the controller 50 may de-rate the engine (e.g., the diesel engine 76 shown in FIG. 2) to reduce peak external temperatures about the engine 76 itself (and, therefore, within or adjacent the debris-gathering regions 94, 98), as well to reduce the peak skin temperatures of components downstream of the engine 76 through which exhaust is conducted (within the debris-gathering regions 92, 96). In certain extreme cases, startup of the work vehicle engine may be prohibited until the excessive debris accumulation condition is remedied. Additionally or alternatively, aftertreatment regeneration events may be temporarily disabled, such as high temperature purging of the DPF contained in the first aftertreatment stage 88. Finally, in certain cases, such as when the debris accumulation risk level reaches critical levels, still other functionalities of the work vehicle may be inhibited under the excessive FOD accumulation condition is resolved. In this latter regard, movement of an implement (e.g., a tool attached to the end of a boom assembly) or usage of a harvesting tool (e.g., the header of a combine) may be disabled, slowed, or otherwise inhibited. For example, in the case of the example loader 20, usage of the FEL assembly 24 may be inhibited (prevented or slowed) when the controller 50 determines that the debris accumulation risk level surpasses a critical threshold during STEP 140 of the process 130.

As just stated, the usage of the FEL assembly 24 may be inhibited when the controller 50 determines that the debris accumulation risk level surpasses a critical threshold during STEP 140 of the process 130 in the case of the example wheel loader 20. Such an action may decrease the likelihood of FOD-induced fires within the wheel loader 20, particularly when the excessive FOD accumulation occurs within the forward frame compartment 118 (FIG. 4), due to the potential for spark generation during usage of the FEL assembly 24. Additionally, such an action may help convey the severity of the detected FOD accumulation to the work vehicle operator, while intuitively conveying the location or region in which the excessive FOD accumulation is located. In this latter regard, the actions or countermeasures implemented by the controller 50 during STEP 140 of the process 130 may be tailored to the particular region or compartment in which the excessive FOD accumulation is detected in embodiments in which the debris accumulation control system 22 concurrently monitors multiple work vehicle compartments for FOD build-up. In instances in which the excessive FOD accumulation occurs within the engine compartment 44 (FIG. 2) such that the debris accumulation risk level surpasses a critical threshold, the above-described countermeasures involving temperature control may be executed by the controller 50. Comparatively, in instances in which the excessive FOD accumulation occurs within the transmission compartment 104 (FIG. 3) or the forward frame compartment 118 (FIG. 4), the controller 50 may instead perform countermeasures involving inhibiting the FEL assembly 24 or, perhaps, limiting work vehicle ground speed. In either scenario, advisory alerts are beneficially generated on the display device 52 to notify the work vehicle operator of the countermeasure taken by the controller 50 and the detected excessive FOD accumulation motivating the countermeasures. Additionally, in embodiments in which the wheel loader 20 is equipped with a system for clearing FOD build-up (e.g., an airflow impingement system) or a liquid coolant system for reducing skin temperatures of high temperature work vehicle components, the controller 50 may activate such a system or intensify the operation of such a system if already active.

The controller 50 next advances to STEP 146 of the debris accumulation control process 130 after generating the high level visual alert and/or performing any appropriate excessive debris countermeasure actions during STEP 140, as previously described. During STEP 146 of the process 130, the controller 50 determines whether the current iteration of the debris accumulation control process 130 should terminate; e.g., due to work vehicle shutdown (or elapse of a predetermined time period following vehicle shutdown) or due to removal of the condition or trigger event in response to which the process 130 initially commenced. If determining that the debris accumulation control process 130 should terminate at STEP 146, the controller 50 progresses to STEP 148 of the process 130, and the debris accumulation control process 130 terminates accordingly. If instead determining that the process 130 should continue, the controller 50 returns to STEP 134 and the above-described process steps repeat.

If instead determines that the debris accumulation risk level for the monitored work vehicle compartment(s) does not surpass the higher (critical) threshold during STEP 138, the controller 50 advances to STEP 142 of the debris accumulation control process 130. During STEP 142, the controller 50 compares the debris accumulation risk level to a second (caution) threshold value, which is less than the first (warning or critical) threshold value discussed above in connection with STEP 138. If determining that the debris accumulation risk level falls below the caution threshold value, the controller 50 progresses to STEP 146 of the process 130 and determines whether the current iteration of the debris accumulation control process 130 should terminate, as just described. Otherwise, the controller 50 continues to STEP 144 and performs certain low level actions or countermeasures. Such low level actions may include the generation of a low level visual alert on the display device 56, which may bring an operator's attention to the excessive debris accumulation in a less urgent fashion. For example, such a low level visual alert may be color coded to an informational color (e.g., green or white) or to a cautionary color (e.g., orange). Again, the visual alert may be expressed utilizing any combination of symbology or text and usefully identifies the rationale underlying the alert (the detection of an excessive debris accumulation), as well as the location of the excessive debris accumulation when multiple work vehicle compartments are monitored utilizing the debris accumulation control system 22. Certain other low level actions may also be taken concurrently with generating such an informational or advisory alert. For example, in embodiments in which the work vehicle is equipped with a cooling system affecting relevant skin surface temperatures or a debris-clearance system, such a system may be activated if presently inactive. Following such actions at STEP 114, the controller 50 advances to STEP 146 and determines whether the current iteration of the debris accumulation control process 130 should terminate as previously described.

In the above-described manner, the controller 50 of the debris accumulation control system 22 can repeatedly perform iterations of debris accumulation control process 130 to selectively generate alerts or notifications bringing excessive debris accumulations to an operator's attention in a prompt manner, as well as to automatically perform other graded responses or excessive debris countermeasures to address such detected debris accumulations when appropriate. In further embodiments, the above-described excessive debris alerts can be generated when the operator is remotely located relative to the machine, with the alert generated at the remote location. As an example, when the work vehicle on which the debris accumulation control system 22 is deployed is capable of connection to a network, such as the Internet, a local area network (LAN), a cellular network, or a combination thereof, the controller 50 of the debris accumulation control system 22 may transmit such excessive debris alerts to any number of network-connected devices associated with the work machine or an operator-account created for the work machine. As a specific example, excessive debris alerts could be sent to the operator's smartphone or a similar network-connected device in embodiments.

ENUMERATED EXAMPLES OF THE WORK VEHICLE DEBRIS ACCUMULATION CONTROL SYSTEM

The following examples of the debris accumulation control system are further provided and numbered for ease of reference.

1. A work vehicle debris accumulation control system is utilized onboard a work vehicle having an operator station and a work vehicle compartment. Embodiments of the work vehicle debris accumulation control system include a display device located in the operator station of the work vehicle, a three dimensional (3D) imaging device having a field of view (FOV) encompassing a debris-gathering region of the work vehicle compartment, and a controller operably coupled to the display device and to the 3D imaging device. The controller is configured to: (i) utilize 3D imaging data provided by the 3D imaging device to estimate a debris accumulation risk level within the work vehicle compartment; and (ii) generate a first visual alert on the display device when the debris accumulation risk level surpasses a first predetermined threshold.

2. The work vehicle debris accumulation control system of example 1, wherein the controller is configured to: (i) calculate a debris accumulation volume in the debris-gathering region of the work vehicle compartment based, at least in part, on the 3D imaging data provided by the 3D imaging device; and (ii) estimate the debris accumulation risk level based, at least in part, on the calculated debris accumulation volume.

3. The work vehicle debris accumulation control system of example 2, further including a memory storing baseline map data including 3D imaging data captured by 3D imaging device of the debris-gathering region in an essentially debris-free state. The controller is coupled to the memory and is configured to calculate the debris accumulation volume in the debris-gathering region of the work vehicle compartment based, at least in part, on a comparison between the 3D imaging data and the baseline map data.

4. The work vehicle debris accumulation control system of example 1, further including a memory baseline map data defining categorized risk zones within the FOV of the 3D imaging device. The controller is coupled to the memory and is configured to: (i) determine a debris accumulation distribution within the work vehicle compartment; and (ii) estimate the debris accumulation risk level based, at least in part, on the debris accumulation distribution relative to the categorized risk zones within the FOV of the 3D imaging device.

5. The work vehicle debris accumulation control system of example 1, wherein the controller is further configured to: (i) monitor a rate of debris accumulation within the debris-gathering region of the work vehicle compartment; and (ii) estimate the debris accumulation risk level based, at least in part, on the monitored rate of debris accumulation.

6. The work vehicle debris accumulation control system of example 1, wherein the first visual alert includes a low level visual alert. The controller is further configured to generate a high level visual alert on the display device when the debris accumulation risk level surpasses a second predetermined threshold greater than the first predetermined threshold.

7. The work vehicle debris accumulation control system of example 1, wherein the controller is further configured to: (i) determine when the debris accumulation risk level surpasses a critical risk threshold greater than the first predetermined threshold; and (ii) automatically execute an excessive debris countermeasure when determining that the debris accumulation risk level surpasses the critical risk threshold.

8. The work vehicle debris accumulation control system of example 7, wherein the work vehicle includes an engine assembly, and the excessive debris countermeasure includes derating the engine assembly.

9. The work vehicle debris accumulation control system of example 7, wherein the work vehicle includes aftertreatment regeneration system, and the excessive debris countermeasure includes inhibiting operation of the aftertreatment regeneration system.

10. The work vehicle debris accumulation control system of example 7, wherein the work vehicle includes a movable implement, and the excessive debris countermeasure inhibiting operation of the movable implement.

11. The work vehicle debris accumulation control system of example 1, wherein the 3D imaging device includes at least a first camera operable in at least one of the visible and infrared portions of the electromagnetic spectrum. The controller is further configured to selectively present a live camera feed from the first camera on the display device.

12. The work vehicle debris accumulation control system of example 11, wherein the controller is configured to: (i) determine when the debris accumulation risk level surpasses a second predetermined threshold equal to or greater than the first predetermined threshold; and (ii) when determining that the debris accumulation risk level surpasses a second predetermined threshold, automatically presenting or automatically offering to present the live camera feed on the display device.

13. The work vehicle debris accumulation control system of example 1, wherein the work vehicle includes an engine assembly, the work vehicle compartment includes an engine compartment in which the engine assembly is located, and the engine assembly borders the debris-gathering region.

14. The work vehicle debris accumulation control system of example 1, wherein the work vehicle includes a frame surface susceptible to the collection of debris during work vehicle operation, and wherein the frame surface at least partially defines a floor of the debris-gathering region.

15. The work vehicle debris accumulation control system of example 1, wherein the 3D imaging device assumes the form of a stereoscopic camera assembly.

CONCLUSION

There has thus been provided embodiments of a debris accumulation control system for usage in conjunction with work vehicles, such as work vehicles operated in debris-laden ambient environments. The work vehicle debris accumulation control system utilizes any number of 3D imaging devices to monitor FOD build-up within one or more work vehicle compartments. Embodiments of the debris accumulation control system may utilize 3D imaging data provided by the 3D imaging device(s) to monitor volumetric debris accumulation within the debris-gathering region by comparison to baseline map data of the monitored regions in a clean or essentially debris-free state. In certain instances, the debris accumulation control system may assign a debris accumulation risk level to the monitored regions (or, more generally, the work vehicle compartment) and then perform any number of prescribed actions or countermeasures when the debris accumulation risk level surpasses a predetermined threshold. Such actions may range from generating visual alerts of varying urgencies on a display device to notify an operator of the excessive debris build-up, to activating any cooling or debris clearance mechanisms onboard the work vehicle, to inhibiting or disabling certain work vehicle functions when warranted. Embodiments of the debris accumulation control may further provide other useful functions, such as allowing an operator to view a live camera feed of a monitored debris-gathering region when the 3D imaging device contains at least one camera and/or to capture a progression video of debris build-up for diagnostic purposes. By providing any combination of the above-described functions, embodiments of the debris accumulation control system may provide more tailored assessments of problematic debris accumulation within various types of work vehicles and provide (or promote) proportionate responses to address such debris accumulation on an as-needed basis.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle debris accumulation control system utilized onboard a work vehicle having an operator station and a work vehicle compartment, the work vehicle debris accumulation control system comprising:
   a display device located in the operator station of the work vehicle;
   a three dimensional (3D) imaging device having a field of view (FOV) encompassing a debris-gathering region of the work vehicle compartment; and
   a controller operably coupled to the display device and to the 3D imaging device, the controller configured to:
      utilize 3D imaging data provided by the 3D imaging device to estimate a debris accumulation risk level in which the debris accumulation risk level is an indication of debris accumulating within the work vehicle compartment; and
      generate a first visual alert on the display device when the debris accumulation risk level surpasses a first predetermined threshold.

2. The work vehicle debris accumulation control system of claim 1, wherein the controller is configured to:
   calculate a debris accumulation volume in the debris-gathering region of the work vehicle compartment based, at least in part, on the 3D imaging data provided by the 3D imaging device; and
   estimate the debris accumulation risk level based, at least in part, on the calculated debris accumulation volume.

3. The work vehicle debris accumulation control system of claim 2, further comprising a memory storing baseline map data comprising 3D imaging data captured by 3D imaging device of the debris-gathering region in an essentially debris-free state;
   wherein the controller is coupled to the memory and is configured to calculate the debris accumulation volume in the debris-gathering region of the work vehicle compartment based, at least in part, on a comparison between the 3D imaging data and the baseline map data.

4. The work vehicle debris accumulation control system of claim 1, further comprising a memory baseline map data defining categorized risk zones within the FOV of the 3D imaging device; and
    wherein the controller is coupled to the memory and is configured to:
        determine a debris accumulation distribution within the work vehicle compartment; and
        estimate the debris accumulation risk level based, at least in part, on the debris accumulation distribution relative to the categorized risk zones within the FOV of the 3D imaging device.

5. The work vehicle debris accumulation control system of claim 1, wherein the controller is further configured to:
    monitor a rate of debris accumulation within the debris-gathering region of the work vehicle compartment; and
    estimate the debris accumulation risk level based, at least in part, on the monitored rate of debris accumulation.

6. The work vehicle debris accumulation control system of claim 1, wherein the first visual alert comprises a low level visual alert; and
    wherein the controller is further configured to generate a high level visual alert on the display device when the debris accumulation risk level surpasses a second predetermined threshold greater than the first predetermined threshold.

7. The work vehicle debris accumulation control system of claim 1, wherein the controller is further configured to:
    determine when the debris accumulation risk level surpasses a critical risk threshold greater than the first predetermined threshold; and
    automatically execute an excessive debris countermeasure when determining that the debris accumulation risk level surpasses the critical risk threshold.

8. The work vehicle debris accumulation control system of claim 7, wherein the work vehicle comprises an engine assembly; and
    wherein the excessive debris countermeasure comprises derating the engine assembly.

9. The work vehicle debris accumulation control system of claim 7, wherein the work vehicle comprises aftertreatment regeneration system; and
    wherein the excessive debris countermeasure comprises inhibiting operation of the aftertreatment regeneration system.

10. The work vehicle debris accumulation control system of claim 7, wherein the work vehicle comprises a movable implement; and
    wherein the excessive debris countermeasure inhibiting operation of the movable implement.

11. The work vehicle debris accumulation control system of claim 1, wherein the 3D imaging device comprises at least a first camera; and
    wherein the controller is further configured to selectively present a live camera feed from the first camera on the display device.

12. The work vehicle debris accumulation control system of claim 11, wherein the controller is configured to:
    determine when the debris accumulation risk level surpasses a second predetermined threshold equal to or greater than the first predetermined threshold; and
    when determining that the debris accumulation risk level surpasses a second predetermined threshold, automatically presenting or automatically offering to present the live camera feed on the display device.

13. The work vehicle debris accumulation control system of claim 1, wherein the work vehicle comprises an engine assembly;
    wherein the work vehicle compartment comprises an engine compartment in which the engine assembly is located; and
    wherein the engine assembly borders the debris-gathering region.

14. The work vehicle debris accumulation control system of claim 1, wherein the work vehicle comprises a frame surface susceptible to the collection of debris during work vehicle operation; and
    wherein the frame surface at least partially defines a floor of the debris-gathering region.

15. The work vehicle debris accumulation control system of claim 1, wherein the 3D imaging device comprises a stereoscopic camera assembly.

16. The work vehicle debris accumulation control system of claim 1, wherein the 3D imaging device comprises an acoustic or radar sensor.

17. The work vehicle debris accumulation control system of claim 1, further comprising a memory accessible to the controller;
    wherein the controller is configured to store a debris accumulation progression video in the memory compiled from the 3D imaging data provided by the 3D imaging sensor over a period of time.

18. A work vehicle debris accumulation control system utilized onboard a work vehicle having an operator station and a work vehicle compartment, the work vehicle debris accumulation control system comprising:
    a three dimensional (3D) imaging device having a field of view (FOV) encompassing a debris-gathering region within the work vehicle compartment;
    a memory storing baseline map data comprising 3D imaging data captured by the 3D imaging device of the debris-gathering region in an essentially debris-free state; and
    a controller operably coupled to the 3D imaging device and to the memory, the controller configured to:
        utilize 3D imaging data provided by the 3D imaging device, as compared to the baseline map data stored in the memory, to monitor a volume of debris accumulation within the debris-gathering region; and
        selectively generate debris accumulation alerts on a display device based, at least in part, on the monitored volume of debris accumulation within the debris-gathering region.

19. The work vehicle debris accumulation control system of claim 18, wherein the 3D imaging device comprises a stereoscopic camera assembly; and
    wherein the controller is further configured to selectively present a video feed from a camera included in the stereoscopic camera assembly on the display device.

20. The work vehicle debris accumulation control system of claim 18, wherein the controller is configured to:
    estimate a debris accumulation risk level within the work vehicle compartment based, at least in part, on the monitored volume of debris accumulation within the debris-gathering region;
    generate a low level visual alert on the display device when the debris accumulation risk level surpasses a first predetermined threshold; and
    generate a high level visual alert on the display device when the debris accumulation risk level surpasses a second predetermined threshold greater than the first predetermined threshold.

* * * * *